May 13, 1924.

A. T. POTTER 1,493,645

WINDSHIELD HANDLE ASSEMBLY

Filed March 5, 1923

Inventor
Albert T. Potter.

By Whittemore Hulbert Whittemore
  Belknap          Attorneys

Patented May 13, 1924.

1,493,645

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD-HANDLE ASSEMBLY.

Application filed March 5, 1923. Serial No. 622,992.

*To all whom it may concern:*

Be it known that I, ALBERT T. POTTER, a citizen of the United States of America, residing at Detroit, in the county of Wayne and State of Michigan, have invented certain new and useful Improvements in Windshield-Handle Assemblies, of which the following is a specification, reference being had therein to the accompanying drawings.

This invention relates to windshields and refers more particularly to the handle assembly thereof.

An object of the invention is to provide simple and practical means for securing a handle to the tubing of a windshield frame, whereby any water in the tubing will be prevented from passing outwardly around the securing means and thereby annoying the driver.

Another object is to provide a strong and durable construction which is neat in appearance and which can be manufactured at a comparatively low cost.

With the above and other objects in view, the invention consists of certain novel features of construction, combinations and arrangements of parts as will be more fully described and particularly pointed out in the appended claims.

Figure 1:
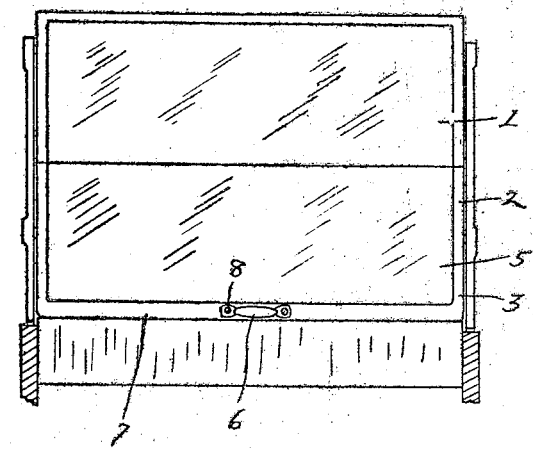
Figure 1 is a rear elevation of a vehicle windshield and showing the handle attached thereto.
Figure 2:
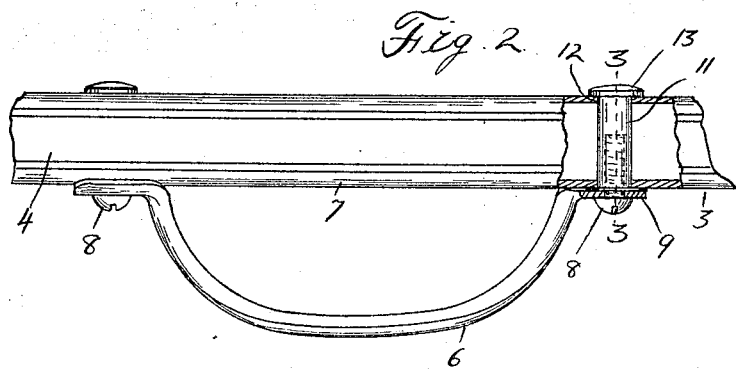
Figure 2 is a fragmentary plan view of the windshield frame with parts in section and showing the handle attached thereto.
Figure 3:
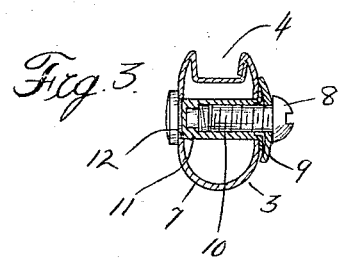
Figure 3 is a sectional view taken on the line 3—3 of Figure 2.

In the past, handles have been secured to the tubing of windshield frames by means of screws and bolts extending through openings in the sides of the tubing, but ordinarily the bolts and screws generally do not fit snugly the openings in the tubing so that any water which trickles into the tubing at the joints may work out through the openings around the screws and bolts with the result that it is apt to splash upon the driver and prove very annoying.

With the present construction, the objectionable features referred to are entirely overcome for the reason that the openings in the tubing are sealed permanently preferably by a part of the securing means.

Referring now to the drawings in which like characters of reference designate corresponding parts throughout the several views, the numeral 1 designates a windshield having a frame 2 formed of metallic tubing 3 which is provided with longitudinally extending channels 4 that receive the edges of the glass 5.

The windshield is adapted to be moved by means of a suitable handle 6 which is preferably detachably secured to the lower tube 7 of the frame 2. In detail, a pair of screws 8 extend through the flattened laterally extending portions 9 of the handle and engage the interiorly threaded portions 10 of a pair of hollow rivets 11 which extend through aligned openings 12 in the sides of the tube 7. The rivets preferably fit the openings 12 snugly and the inner ends thereof are preferably spun over and pressed against the inner side of the tube so as to form a water tight seal. The heads 13 of the rivets are relatively thin and preferably fit the outer side of the tube 7. Thus, the openings 12 in the tube 7 are sealed effectively and any water entering the tube will not be permitted to pass outwardly around the securing elements of the handle.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:—

1. In a handle assembly for windshields, the combination with a tube forming a part of the windshield frame, said tube having openings therein, of a handle, hollow members extending transversely of said tube and having portions sealing the openings therein, and means engageable with said members for securing said handle thereto.

2. In a handle assembly for windshields, the combination with a tube forming a part of the windshield frame, said tube having openings in the opposite side thereof, of a handle, members permanently secured to said tube and having portions sealing the said openings, and headed elements engageable with said members for detachably securing said handles thereto.

3. In a handle assembly for windshields, the combination with a tube forming a part of the windshield frame, said tube having openings in the opposite sides thereof, of a handle, hollow rivets extending through the openings in said tube, the heads of said rivets being pressed against one side of said tube to seal the openings therein, the open ends of said rivets being spun over and pressed against the other side of said tube and sealing the openings therein, and screws extending through portions of said handle and engaging said hollow rivets.

4. In a handle assembly for windshields, the combination with a tube forming a part of the windshield frame, said tube having openings formed in the side walls thereof, of a handle, a member extending through the openings in said side walls and permanently connecting the latter, said member having means for sealing said openings, and means engageable with said member for securing said handle to said tube.

5. In a handle assembly for windshields, the combination with a tube forming a part of the windshield frame, of a handle, a member extending transversely of said tube and permanently secured thereto, and means extending into said tube and engageable with said member for securing said handle to said tube, said member having means for preventing water entering the tube from passing outwardly from said tube around said securing means.

6. In a handle assembly for windshields, the combination with a tube forming a part of the windshield frame, said tube having openings in the opposite sides thereof, of a handle, a hollow headed element extending through the openings in said tube, the head of said element being pressed against one side of said tube to seal the opening therein, the open end of said element being spun over and pressed against the other side of said tube to close the opening therein, and means extending through a portion of said handle and engaging said element for securing said handle to said windshield frame.

7. In a handle assembly for windshields, the combination with a tube forming a part of a windshield frame, said tube having openings in the opposite walls thereof, a member extending transversely of said tube and having portions engaging the outer faces of said walls and sealing the openings therein, a handle, and means engageable with said member for securing said handle to said tube.

In testimony whereof I affix my signature.

ALBERT T. POTTER.